E. E. F. CREIGHTON.
COHERER DISCHARGE INDICATOR.
APPLICATION FILED MAY 11, 1912.
1,115,174. Patented Oct. 27, 1914.
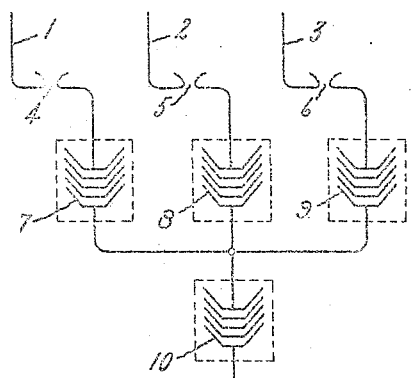
Fig. 1.
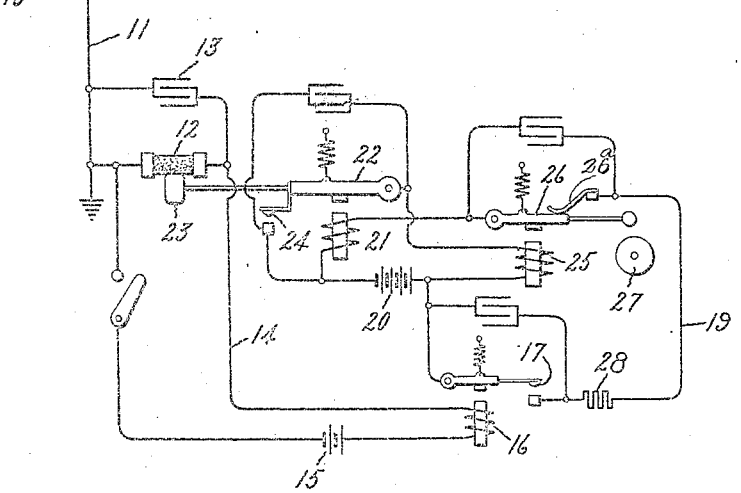
Fig. 3.
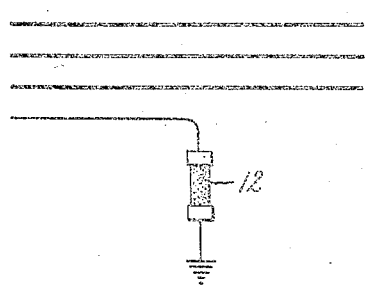
Fig. 2.
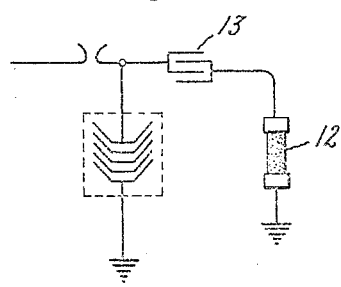
WITNESSES
INVENTOR
ELMER E. F. CREIGHTON
BY
HIS ATTORNEY

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

COHERER-DISCHARGE-INDICATOR.

1,115,174.

Specification of Letters Patent.

Patented Oct. 27, 1914.

Application filed May 11, 1912. Serial No. 696,550.

*To all whom it may concern:*

Be it known that I, ELMER E. F. CREIGHTON, a citizen of the United States, residing at Schenectady, county of Schenectady, State of New York, have invented certain new and useful Improvements in Coherer Discharge-Indicators, of which the following is a specification.

My invention relates to instruments operating in response to transitory discharges of electricity.

The object of my invention is to provide a device responsive to transitory surges and capable of withstanding discharges of great quantities of electricity, and also capable of operation on discharges of extremely small quantities.

The main difficulty in the design of an instrument to respond to transitory surges lies in the wide range of quantity of electricity to which the instrument must respond and which it must withstand. In the operation of arresters, either of the multigap or aluminum type, the smallest discharge is the one of just sufficient potential to spark over the gap or gaps when the generator potential is zero, or near enough to zero not to cause a dynamic current to follow the static spark. The energy of such a spark is insufficient to operate most devices which are capable of withstanding the surges of greater quantities of electricity, as when the dynamic current under high generator potential follows the first static discharge. There are various known ways of indicating the discharge, but in general they are all subject to the fault that if made rigid enough to withstand the heavy discharges to which they are at times subjected, they are not delicate enough to respond to small discharges, or if made delicate enough to respond to the small discharges, they are not capable of standing the heavy discharges. Some indicators are also objectionable in that an inductance in the arrester circuit is necessary.

I propose to use a coherer which may be of the Branley type such as I have shown, and by means of a local circuit including the coherer, indicate or record, or both, each coherence of the contained material. The coherer may be arranged in a number of different ways to have potential impressed upon it at each discharge of the line. A visual or audible indicator may be actuated on each coherence of the particles, or a permanent record may be made by any of the well known devices as will be further explained in the detail description. Such a device is subject to none of the faults indicated above.

In the drawings which form a part of this specification, I have illustrated diagrammatically various forms assumed by my invention.

Figure 1 illustrates diagrammatically one construction embodying my invention. Figs. 2 and 3 illustrate modified connections of the coherer to make it responsive to discharges.

In Fig. 1, I have shown a plurality of leads 1, 2 and 3 from a transmission system, which through these leads, spark gaps 4, 5 and 6, and the electrolytic lightning arresters 7, 8, 9 and 10, are connected to ground. The arrangement of spark gaps and electrolytic cells may be any well known or suitable one. To a point on the lead 11 connected direct to ground, I prefer to connect one end of the coherer 12. The other end of the coherer 12, I prefer to connect through a condenser 13 to another point on the lead 11, preferably spanning a considerable length of the lead 11, or a section containing turns or loops, if such are found necessary in wiring up the arrester.

A local circuit 14 including a source of energy 15 and an electromagnetic controlling device 16, later described, is completed through the coherer 12. A dry battery, impressing on the coherer a voltage about 80% of that necessary to cause coherence, has been found to be a satisfactory source of energy. A switch may be included in the circuit 14 for permanently opening the same if desired. The electromagnet of the controller 16 controls normally open contacts 17 which are a part of a circuit 19 including a source of energy 20, and the electromagnet 21 of a vibrating switch arm 22. The vibrating switch arm 22 may be the decoherer, carrying for that purpose the small hammer 23 for tapping the coherer 12. This vibrator arm 22 also controls the normally open contacts 24 in a circuit including the source of energy 20 and the electromagnet 25; this electromagnet directly controls the indicating or recording device. An arm 26 of the indicating or recording device is in the circuit 19. The part 27 may be a visual or audible indicator actuated by the arm 26, or any well known form of recording device for recording the engagement therewith of the arm 26.

The arm 26 when pulled into engagement with the device 27 by the magnet 25, opens the circuit 19 and allows the release of vibrator arm 22, which under the action of its spring, returns to normal position, decohering the coherer 12. As the arm 26 controls the action of the decoherer, it will be apparent that an alarm or a record must be made by the arm 26 before the decoherer can operate.

Small condensers may be placed in shunt to the various contacts and resistances, as 28, in series therewith as desired to prevent sparkling and consequent false coherence.

A device so constructed operates as follows: On the occurrence of a discharge from the line through the arresters, the drop across the length of lead 11 spanned by the connections to the coherer 12 causes the impression of a small high frequency potential on the coherer, causing the lowering of the coherer's resistance sufficient to allow current to pass from the source of energy 15. The electromagnet of the controlling device 16 is thereby energized and the contacts 17 closed. The coherer circuit is thus completed from the battery 15, through coherer 12 and electromagnet 16. The electromagnet 16 is energized and attracts its armature to close the contacts 17 in the decoherer circuit. When contacts 17 are closed, the decoherer circuit is completed from the battery 20, through contacts 17, arm 26 and electromagnet 21. The electromagnet 21 being energized, moves the vibrator arm 22 from decohering to inoperative position and the decoherer is thus prevented from operating until the decoherer circuit is broken. In moving to inoperative position, the vibrator arm moves the hammer or tapper 23 out of engagement with the coherer 12 and also closes contacts 24 in the indicating or recording circuit. This circuit is completed from the battery 20 through contacts 24, arm 22 and electromagnet 25. The electromagnet 25, thereupon, attracts the recording arm 26 moving it into recording position. In resilient engagement with the arm 26 is a spring or resilient contact 26ª which acts to maintain the indicator circuit closed until the work done by the arm 26 is completed whether it is in making a permanent record or visually or audibly indicating the same. After the arm 26 is moved toward electromagnet 25 a definite distance, the spring contact 26ª breaks engagement with the arm 26 thus breaking the decoherer circuit and allowing the vibrator arm 22 to be released by its electromagnet 21 from inoperative position, whereupon it moves quickly under the action of its spring, to decohering position, the hammer 23 striking a blow upon the coherer 12 to decohere it. The arm 22 at the same time opens contacts 24 and breaks the indicator or recording circuit, allowing the arm 26 to again come into engagement with its spring contact 26ª under the action of its spring. It will be apparent from this description that the indicating or recording circuit controls the decoherer circuit in such a way that the coherer is not decohered until a suitable indication of coherence is made. By this means sufficient time is given at each discharge of the arrester to indicate or record the same before decoherence takes place. When the arm 22 moves to decohering position and the hammer 23 has operated the parts, with the possible exception of the contacts 17, are now in their first position. Should the discharge have ceased, the decoherence of the particles allows the deënergization of the electromagnet in the controller 16 and the separation of the contacts 17. Should, however, on the other hand, the discharge through the arresters be continuing, the contact 17 will be maintained in engagement or brought again into engagement by the recoherence, and other actuations of the recording arm 26 and the decohering hammer 23 will be made. These operations will continue as long as the discharge through the arresters continues.

There are a number of possible methods for connecting the coherer in order that it may be affected by a discharge. In Fig. 2 another way in which the condenser 13 and coherer 12 may be connected to shunt a part of the lightning arrester grounding connection is shown. In this particular instance one side of the two in series is connected to a point between the spark gap and the electrolytic cell and the other side of the series is connected to ground.

In Fig. 3 still another connection of a coherer is shown. In this case a short antenna running close to the line is connected to one side of the coherer, the other side of the coherer being connected to ground.

What I claim as new and desire to secure by Letters Patent of the United States, is:

1. A discharge indicator comprising a detector operated in response to a discharge, means for recording the operation of said detector, means for restoring said detector to normal condition after it has operated, and means for preventing said restoring means from operating until said recording means has operated.

2. A discharge indicator comprising a coherer, a decoherer, means for recording the coherence of said coherer, and means for preventing the decoherence of said coherer until said recording means has operated.

3. A discharge indicator comprising a coherer, a decoherer, a device for indicating the coherence of said coherer, and means for preventing said decoherer from operating until said indicating device has operated.

4. The combination with a coherer, of an electroresponsive device controlled by said coherer, a coherence indicator responsive to the energization of said electroresponsive device, and a decoherer controlled by said indicator to operate therewith in a definite sequence.

5. A discharge indicator comprising a coherer, a decoherer, and a control circuit for said decoherer closed by the coherence of said coherer comprising an indicating device for indicating when said coherence occurs, and means for rendering said decoherer inoperative until said indicating device operates.

6. In combination a coherer, an electroresponsive device controlled by said coherer, a circuit controlled by said electroresponsive device, a decoherer in said circuit comprising a vibrator arm and means for preventing said vibrator arm from operating while said circuit is energized, and an indicator in a circuit closed by said vibrator arm when inoperative, said indicator after operating opening the circuit of said decoherer whereby said vibrator arm is released to decohere said coherer.

7. The combination with a coherer, of an electroresponsive device energized in response to coherence of said coherer, a decoherer rendered inoperative in response to the energization of said electroresponsive device, a recording device set into operation by the movement of said decoherer when rendered inoperative, said recording device after operating causing said decoherer to move into decohering position.

8. The combination with a circuit including a coherer and an electroresponsive device energized in response to coherence of said coherer, a second circuit closed by said electroresponsive device including an electromagnet and a recording arm, a decohering vibrator arm coöperating with said coherer and movable in response to said electromagnet out of decohering position, a third circuit completed by said vibrator arm when moved out of decohering position including a second electromagnet, said second electromagnet causing said recording arm to move into recording position to indicate the coherence of said coherer, and a spring contact member coöperating with said recording arm to open said second circuit after said arm has moved into recording position whereby said vibrator arm moves to decohering position.

9. In combination a decoherer, an indicator operatively related to said coherer for registering the coherence of said coherer, a decoherer rendered inoperative in response to coherence of said coherer, and means for moving said decoherer into decohering position after said indicator has operated.

In witness whereof, I have hereunto set my hand this 9th day of May, 1912.

ELMER E. F. CREIGHTON.

Witnesses:
HELEN ORFORD,
MARGARET E. WOOLLEY.